Figure 1:
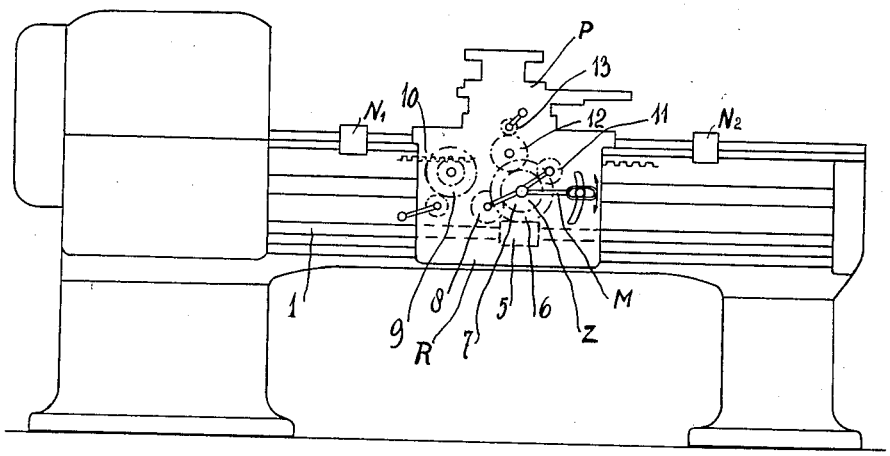

April 18, 1939.  A. OHERA  2,154,915

LATHE

Filed March 9, 1937

Inventor
Albin Ohera
by Michaelis & Michaelis
Attys.

Patented Apr. 18, 1939

2,154,915

UNITED STATES PATENT OFFICE 2,154,915

LATHE

Albín Ohera, Brunn, Czechoslovakia

Application March 9, 1937, Serial No. 129,805
In Czechoslovakia March 9, 1936

5 Claims. (Cl. 82—22)

My invention relates to lathes and more especially to means for automatically stopping the travel of the tool carrier or carriage in lathes provided with stops for the carriage which are relied upon to automatically interrupt the carriage feed.

It is an object of my invention to provide a stopping or disengaging device for the carriage which is particularly simple in design and reliable in operation.

Similar devices hitherto known are provided with means whereby, when the carriage meets the stops, one of the gear wheels, for instance the worm wheel is thrown out. These devices involve the drawback that the stopping of the feed does not occur directly after the carriage has met a stop, whereby the mechanism which drives the carriage is endangered. Moreover these devices are complicated in design and require considerable space in the gear case. -In stopping mechanisms according to this invention means are provided intermediate the driving and the driven parts of the carriage, which as soon as the carriage makes contact with one of the checks or stops, automatically cuts out the clutch coupling the driving and driven members of the carriage feed.

In a preferred form of my invention the disengaging mechanism comprises an organ which coacts with the disengageable parts of the clutch in such manner that on the carriage coming in contact with a stop, first of all the disengageable part of the clutch is actuated, whereupon this organ is influenced by a separate source of energy for disengaging the clutch.

I prefer using a clutch coupling, since this mechanism is particularly simple in design and guarantees an immediate disengaging and stopping of the drive as soon as the carriage has met a stop. The novel device is of compact build, it requires little space in the gear case and is simple and reliable in operation.

In the drawing affixed to this specification and forming part thereof a lathe embodying my invention is illustrated diagrammatically by way of example.

In the drawing

Figure 2:
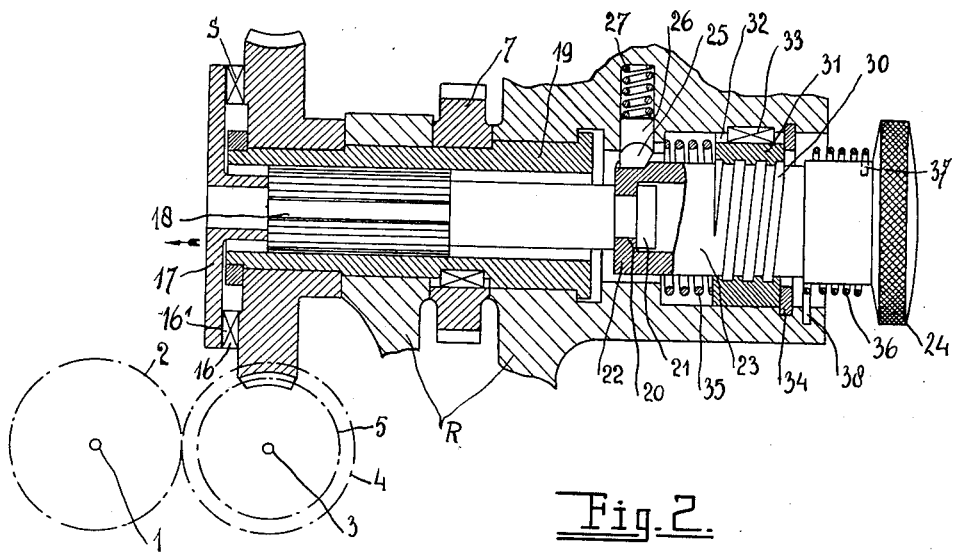

Fig. 1 is a purely diagrammatic elevation, while Fig. 2 is an axial section, drawn to a larger scale, of the disengaging mechanism proper.

Referring to the drawing R is the carriage, 1 is the feed rod driving the carriage and 2, 4 are the gear wheels transmitting power from the feed rod to the spindle 3, on which is fixed a worm 5, which meshes with the worm wheel 6 serving to actuate the toothed wheel 7. 8, 9 are the gear wheels acting on the rack 10 to feed the carriage longitudinally, while the cross feed of the carriage is effected by means of the toothed wheel 7 which acts through a wheel 11 onto the toothed wheel 13 mounted on the threaded spindle. The wheels 7 and 11 are thrown in in a known manner by a lever M according to whether the carriage shall be fed longitudinally or transversely.

On the shaft between the worm wheel 6 and the toothed wheel 7 is inserted the mechanism Z according to this invention, which serves for automatically interrupting the carriage feed whenever the carriage meets one of the stops $N_1$, $N_2$, respectively. The mechanism Z comprises bevelled teeth 16 mounted on the rear face of the worm wheel 6 and similar teeth 16' mounted on a disk 17 facing the worm wheel 6. These teeth form part of the coupling S which transmits power from the worm wheel 6 to the toothed wheel 7. The disk 17 is fixed to the end of the shaft 18, which is arranged for axial displacement in axial grooves of the hollow shaft 19, on which the toothed wheel 7 is keyed, while the worm wheel 6 is loose thereon, being preferably mounted on the shaft 19 by means of antifriction bearings (not shown). The hollow shaft 19 is mounted in suitable bearings formed in the carriage R. The inner shaft 18 is formed, at its farther end, with a groove 20, into which projects an inwardly directed flange 22 of the hollow threaded case 23. On the projecting end of this case is mounted a knob 24 for manual operation. 30 is a flat threading formed on the case and 31 is a nut embracing the case and mounted in a boring of the carriage R for longitudinal displacement, being formed with an axial groove 32, into which projects a key 33 fixed in the inner wall of the boring formed in the carriage. Longitudinal movement of the nut 31 is limited by the stop 34 fixed in the boring of the support. The other end face of the nut 31 abuts against a coil spring 35 inserted in the boring of the support R and being so dimensioned that its tension exceeds the cutting resistance during operation, thus holding the nut 31 applied against the stop 34.

The inner end of the case 22 is formed with an axial groove 25 having a cam face, into which projects a pin 26 guided in a radial boring of the support R and acted upon by a coil spring 27, a cam face on the pin being applied against the cam face of the groove. On the free end near the knob 24 the case 23 is encircled by another coil spring 36, one end 38 of which is fixed to the support, while the other end 37 is fixed to the case, this spring being placed under torsional tension and normally tending to rotate the case.

This device operates as follows: During operation of the lathe power is transmitted from the shaft 1 through the wheels 2, 4 and 5 on the worm wheel 6 and by means of the clutch S and shafts 18 and 19 onto the toothed wheel 7 to feed the carriage longitudinally and transversely, respectively. When the carriage R comes in contact with one of the stops N₁ and N₂, respectively, the toothed wheel 7 and the shafts 18 and 19 will stop, while the worm wheel 6, being loose on the shaft 19, continues its rotation. This causes the teeth 16' to glide relative to the teeth 16 and the disk 17 to be shifted axially in the direction of the arrow p. In consequence of this movement of the disk 17 and the shaft 18 fixed to it the head 21 of the shaft exerts a pull on the case 23 and the cam at the end of the groove 25 now forces the pin 26 upwardly against the action of spring 27. At the same time the nut 31 is carried along in the direction of the arrow p, compressing the spring 35. The pin 26 being lifted and disengaged from the case 23, this latter is now free to rotate and enabled to follow the circumferential contraction of the tensioned spring 36, whereby the case is shifted further axially in the direction of the arrow p, thereby altogether disengaging the clutch S. On the clutch being thrown out, the spring 35 will return the nut 31 into its initial position, however the clutch S is thrown out since the distance, through which spring 35 can shift the nut, is shorter than that covered by the action of spring 36.

It can easily be guessed from the drawing in which way the device is reset into its original position. The clutch is reset by turning the knob 24 and case 23, whereby the spring 36 is placed under tension, while the pin 26 enters the groove 25. The clutch can be thrown out manually by pressing the knob 24, whereby the pin 26 and the disk 17 are disengaged.

Obviously the clutch coupling shown in the drawing might be replaced by some other coupling adapted to be disengaged by axial displacement.

I wish it to be understood that I do not desire to be limited to the exact details of construction shown and described for obvious modifications will occur to a person skilled in the art.

I claim:

1. In a lathe in combination, a lathe bed, a carriage movable relative to said bed, means for driving said carriage comprising a driving shaft, a driven shaft, a carriage displacing wheel fixed on said driven shaft, a wheel, loose on said driven shaft, for transmitting power from said driving onto said driven shaft, an axially disengageable clutch member coupling said loose wheel with said driven shaft, when this shaft is rotating, a stop in the path of said carriage, a source of energy tending to axially shift and disengage said clutch member from said loose power transmitting wheel and means, arranged to be automatically disengaged by an axial displacement of said clutch member, for temporarily preventing action of said source of energy on said clutch member.

2. The mechanism of claim 1, in which the source of energy is a torsionally active spring, a member coupled with the clutch member for axial movement being influenced by said spring and the means for preventing action of the source of energy being a cam check arranged for coacting with said spring-acted member to prevent circumferential movement thereof.

3. The mechanism of claim 1, in which the source of energy is a torsionally active spring, a member coupled with the clutch member for axial movement being influenced by said spring, the means for preventing action of the source of energy being a cam check arranged for coacting with said spring-acted member to prevent circumferential movement thereof and another spring being arranged to counteract axial movement of said spring-acted member, when released by said cam check.

4. The mechanism of claim 1, in which the source of energy is a torsionally active spring, a member coupled with the clutch member for axial movement being influenced by said spring, screw threading on said spring-acted member, a nut on said screw thread and another spring arranged to counteract axial movement of said nut.

5. The mechanism of claim 1, in which the source of energy is a torsionally active spring, the force of which corresponds to the resistance offered to machining by the material under treatment on the lathe.

ALBÍN OHERA.